United States Patent [19]

Spackova et al.

[11] Patent Number: 4,539,585
[45] Date of Patent: Sep. 3, 1985

[54] PREVIEWER

[76] Inventors: Daniela S. Spackova, 300 W. 55th St., New York, N.Y. 10019; Richard M. Chen, 51-25 Goldsmith St., Elmhurst, N.Y. 11373

[21] Appl. No.: 282,055

[22] Filed: Jul. 10, 1981

[51] Int. Cl.³ .............................................. H04N 7/18
[52] U.S. Cl. .................................... 358/93; 358/183; 358/903; 434/94; 434/371
[58] Field of Search ................ 358/93, 104, 903, 181, 358/182, 183, 185, 107; 434/94, 371, 155; 352/39

[56] References Cited

U.S. PATENT DOCUMENTS 3,510,210 5/1970 Hahey ..................................... 352/39
3,621,214 11/1971 Romney .............................. 358/903

FOREIGN PATENT DOCUMENTS 1020276 11/1977 Canada ................................... 358/93
0024862 3/1981 European Pat. Off. ............... 358/93

Primary Examiner—Howard W. Britton
Assistant Examiner—Edward L. Coles
Attorney, Agent, or Firm—Marvin Feldman

[57] ABSTRACT

A previewer provides for the dynamic viewing of an article desired to be worn by the user in a complete series of poses without actually trying on the article. The image of the article is computer generated, and a large plurality of articles are available for previewing. The user pre-records, or creates in realtime, a series of poses which are time-framed and position orientation coded, which coded information is read by the computer and the computer generated article image is then re-imaged in accordance with the accessed coded information, and the re-imaged article image and the user video image are then video mixed, optically mixed, or superimposed in digital image storage memory, so that a user plus article composite image may be viewed by the user. The previewer is useful for previewing various articles or accessories, or combinations thereof, such as eyeglasses, hats, hairstyles, wigs, make-up, cosmetic surgical changes, clothing, furnishings, and automobile accessories.

23 Claims, 5 Drawing Figures

PREVIEWER

FIELD OF THE INVENTION

This invention relates to a previewer. Specifically this invention relates to a previewer wherein articles may be dynamically viewed in relation to the context of their use.

BACKGROUND AND DISCUSSION OF THE PRIOR ART

It has long been desired in the prior art to provide a previewer whereby the user could preview an article to be worn, such as an article of clothing, without physically trying one the article or a large plurality of such articles, before selecting a desired article.

One early attempt is disclosed in Bourdier, et al, U.S. Pat. No. 3,507,570, granted Apr. 21, 1970 wherein an optical composite image was provided. That system was limited to a fixed physical position of the user and the number of pre-recorded article views was extremely limited. A more recent improvement is the system of Maloomian, U.S. Pat. No. 4,261,012, granted Apr. 7, 1981, wherein a series of model posed images are video stored and a video composite image with the viewer's image is rendered on a television monitor. The Maloomian system is limited to the particular number and particular poses that have been pre-recorded, and further requires substantial model or posing time for inputting the system.

Therefore, such prior art systems were costly to utilize and severely limited in the scope of appearances available to the viewer, and the composite viewed images were static in nature.

It was also known in the prior art to provide a computer image generated display image and superimposing another image thereon such as is disclosed in U.S. Pat. No. 3,617,630 granted Nov. 2, 1971 Reiffel; U.S. Pat. No. 4,246,605 granted Jan. 20, 1981 La Russa; and U.S. Pat. No. 4,255,766 granted Mar. 10, 1981 to Matsuda, et al.

Now there is provided by the present invention a previewer wherein the user can dynamicaly preview an article or a plurality of articles in a dynamic viewing mode.

It is therefore a principal object of the present invention to provide a novel previewer with dynamic as well as static previewing of an article in varying positions or poses.

It is another object of the present invention to provide a previewer as aforesaid in which one or several articles may be alternatively or simultaneously previewed.

It is still a further object of the present invention to provide a previewer as aforesaid in which the need for pre-recording modelled images is minimized or eliminated.

It is still a further object of the present invention to provide a system as aforesaid in which the user set up time is minimized.

It is still another object of the present invention to provide a system in which the user image and the article images are dynamically moving in synchronization during the previewing.

It is still another object of the present invention to provide a previewer which is readily usable by the viewer and in which the viewer can leisurely select articles and combination of articles for previewing.

It is a further object of the present invention to provide a previewer whereby the user can preview various pairs of eyeglasses as they would appear when worn by the user, while the user is wearing his or her own prescription eyeglasses.

It is still a further object of the present invention to provide a previewer as immediately aforesaid which eliminates the need to try on pairs of eyeglasses without lenses or with non-prescription lenses, whereby the user is unable to fully and comfortably view the eyeglasses being previewed.

It is still another object of the present invention to provide a previewer in which the user can make alterations to the image of the articles dynamically, and can customize the article to the user image.

It is still another object of the present invention to provide a previewer in which the user can see himself or herself with a newly designed article, such as an on the spot designed hairdo.

SUMMARY OF THE INVENTION

Figure 1:
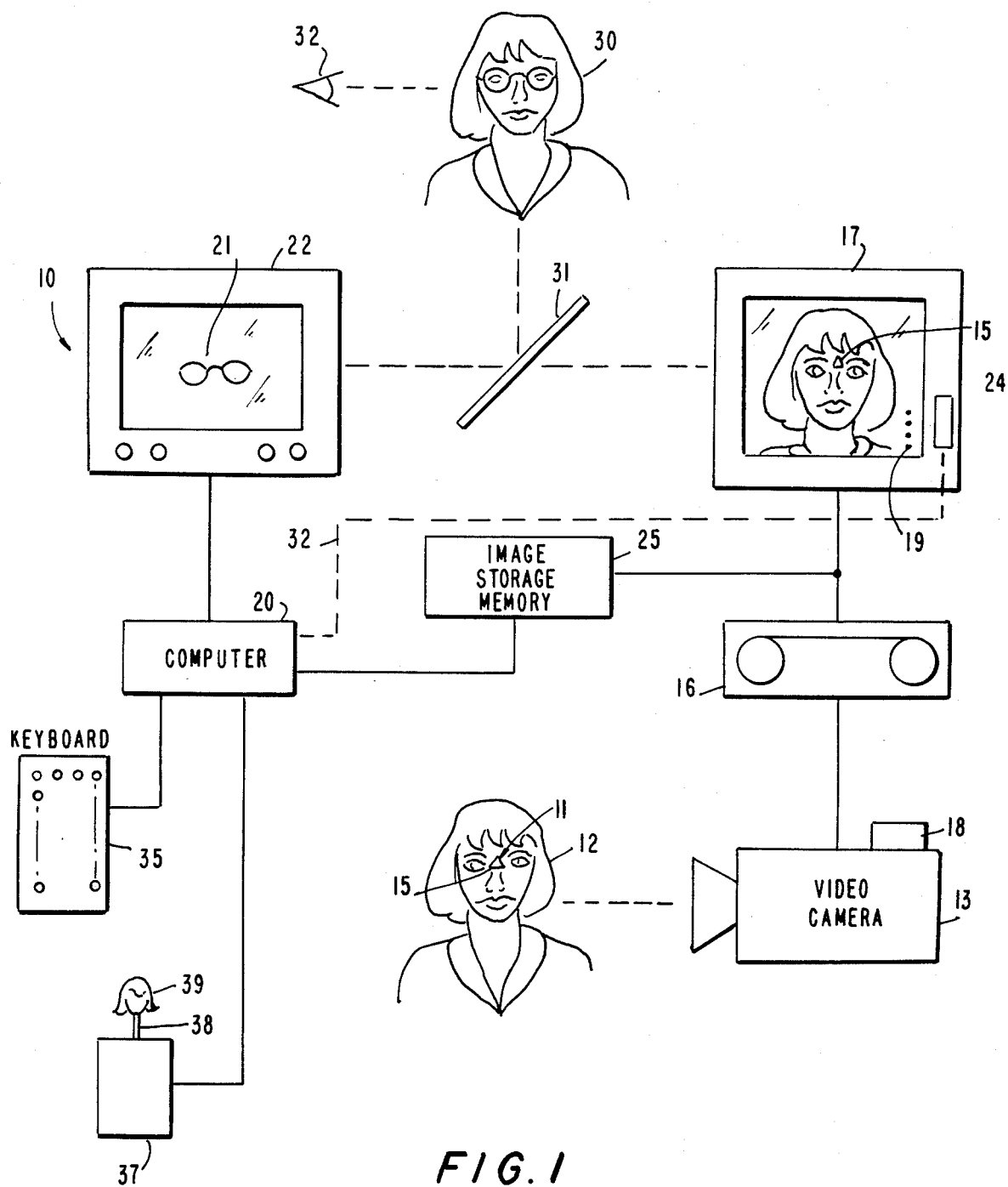
FIG. 1 is a schematic illustration of the previewer of the present invention.

A previewer is provided in which articles are graphically generated by graphics generators such as computers and image processors and dynamically as well as statically viewed with respect to a subject so that as the subject image is re-oriented, the article or a plurality of articles are commensurately re-oriented so that the final image is a composite of the re-imaged article and the re-oriented subject. In one embodiment the re-orientation is continuous so that movement of the subject with commensurate movement and re-imaging of the article occurs.

DESCRIPTION OF THE PREFERRED EMBODIMENT

Referring to FIGS. 1 and 2A-2C there is shown the previewer or previewer system of the present invention 10. Previewer 10 comprises orientation reference means 11 which may be in the form of equilateral triangle 15 as shown, which is worn by the subject 12, for reasons more fully explained hereinafter. Video camera 13, of generally conventional design, images subject 12 with triangle 15 on video recorder 16 which, in turn, transmits the images to subject video monitor 17 for display. Video camera 13 is provided with a binary digit frame identification generator 18 which provides binary digital frame members in the form of a row of dots for recording on each frame, with those lit dots being a specific frame identification number in binary form as is displayed at 19 on monitor 17. A photocell binary digit sensor 24 records and transmits the binary digit information. Other forms of frame identification and coding may also utilized pursuant to the present invention.

A computer graphic video image generator 20, such as is well known to those skilled in the digital and video arts, is designed to provide graphic images of an article, such as eyeglasses 21, which images are displayed on article video monitor 22, for reasons hereinafter appearing.

An image storage memory processory unit 25 is accessed to the video recorder 16 and subject video monitor 17, as well as being accessed to computer 20. Unit 25 may be a Vicom digital 16-bit image processor of Vicom System, Inc., San Jose, Calif. 95131 or a CAT-100 image processor of Digital Graphic Systems, Palo Alto, Calif. 94306. The units 20 and 25 may, of course, be combined as a single unit. In effect, computer 20 and digital image processor 25, process the orientation reference information so as to re-image the article to conform to the position of the subject on a specific frame. The re-imaged article (e.g. eyeglasses) is displayed on monitor 22 and the specific frame pose displayed on monitor 17, and are formed into a composite picture 30 of the subject wearing the eyeglasses by half-silver mirror 31, for viewing by the viewer 32. The viewer may in fact be the pre-recorded subject 12.

Sensor 24 transmits signal 32 to computer 20 so as to reference each frame of each subject orientation position. A keyboard 35 may be utilized to select the article for previewing, such as selecting different types of eyeglasses. Keyboard 35 may also instruct computer 20 to select a specific frame (i.e., subject pose) for viewing with the selected eyeglasses. Keyboard 20 may also instruct the computer to modify the eyeglasses configuration in a customizing manner so as to compensate for hairstyles and the like. The use of the joystick 38 for orientating the article images can displace the equilateral triangle 15, although it will become less convenient to do so. In addition a joystick apparatus 37 is provided wherein the joystick 38 is formed into the configuration of a head 39, for example. In this manner of construction the viewer can move head 39 to the desired orientation or pose and thereby instruct computer 20 and processor 25 in this regard. The user selected orientation position is then matched with the pre-recorded orientation position and that posed position or frame is displayed on monitor 17. At the same time the article is re-imaged to the new orientation position and a new composite image displayed. Keyboard 20 may also instruct the computer to designate the color of the eyeglass to a color or color combination theretofore not designated.

Figure 2C:
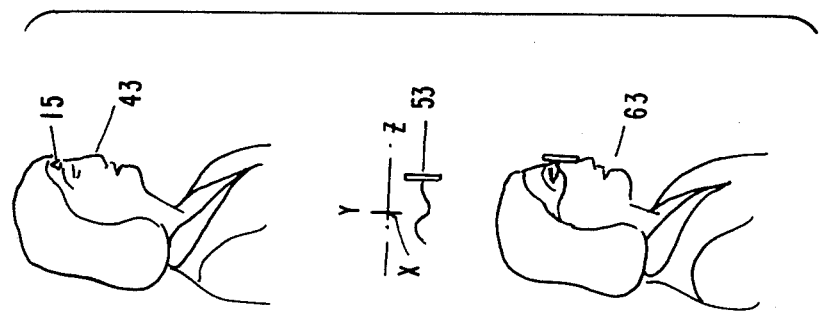
FIGS. 2A-2C are $a$ illustrations of the subject in several recorded poses; $b$ respective views of a position orientation indicator; $c$ the computer generated eyeglass image for each respective pose, and $d$ the composite preview image as seen by the viewer user.
Figure 2B:
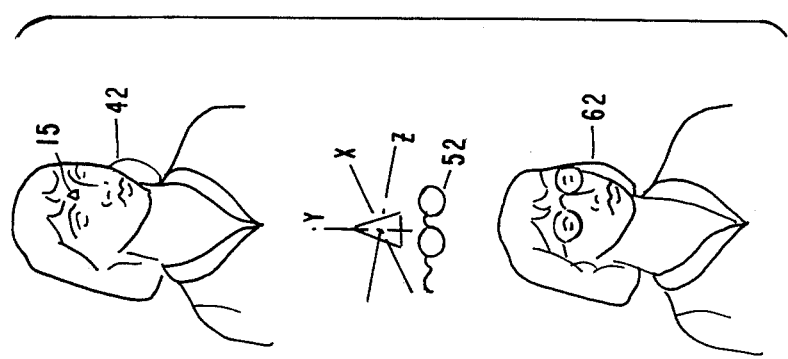
Figure 2A:
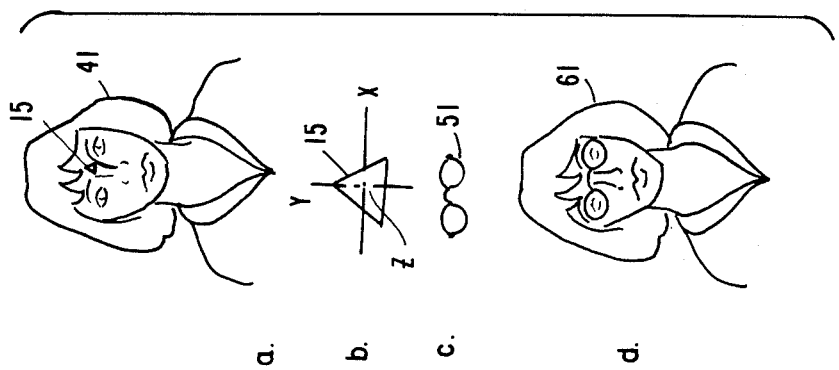

Referring now specifically to FIGS. 2A-2C, there is shown a graphic representation of the orientation reference system of the present invention. Row a represents pre-recorded poses or positions of the subject wearing equilateral triangle indicia 15, namely in full face 41, three-quarter face 42 and profile 43. Row b displays enlarged views of indicia 15 for each respective position 41-43, and x-y-z axes are shown in rotation and translation for each position. The size, location and configuration of the triangle changes with each positional change from the first position 41. Row c displays the imaged or re-imaged article 51, 52 and 53 corresponding to positions 41-43. In point of fact, the equilateral triangle position 41 and front view eyeglass position can be the reference position, and the other positions, e.g. 42 and 43, the re-imaging positions. Row d depicts the composite views 61-62 of the pre-recorded subject and the imaged or re-imaged eyeglasses as seen by the subject viewer.

Figure 3:
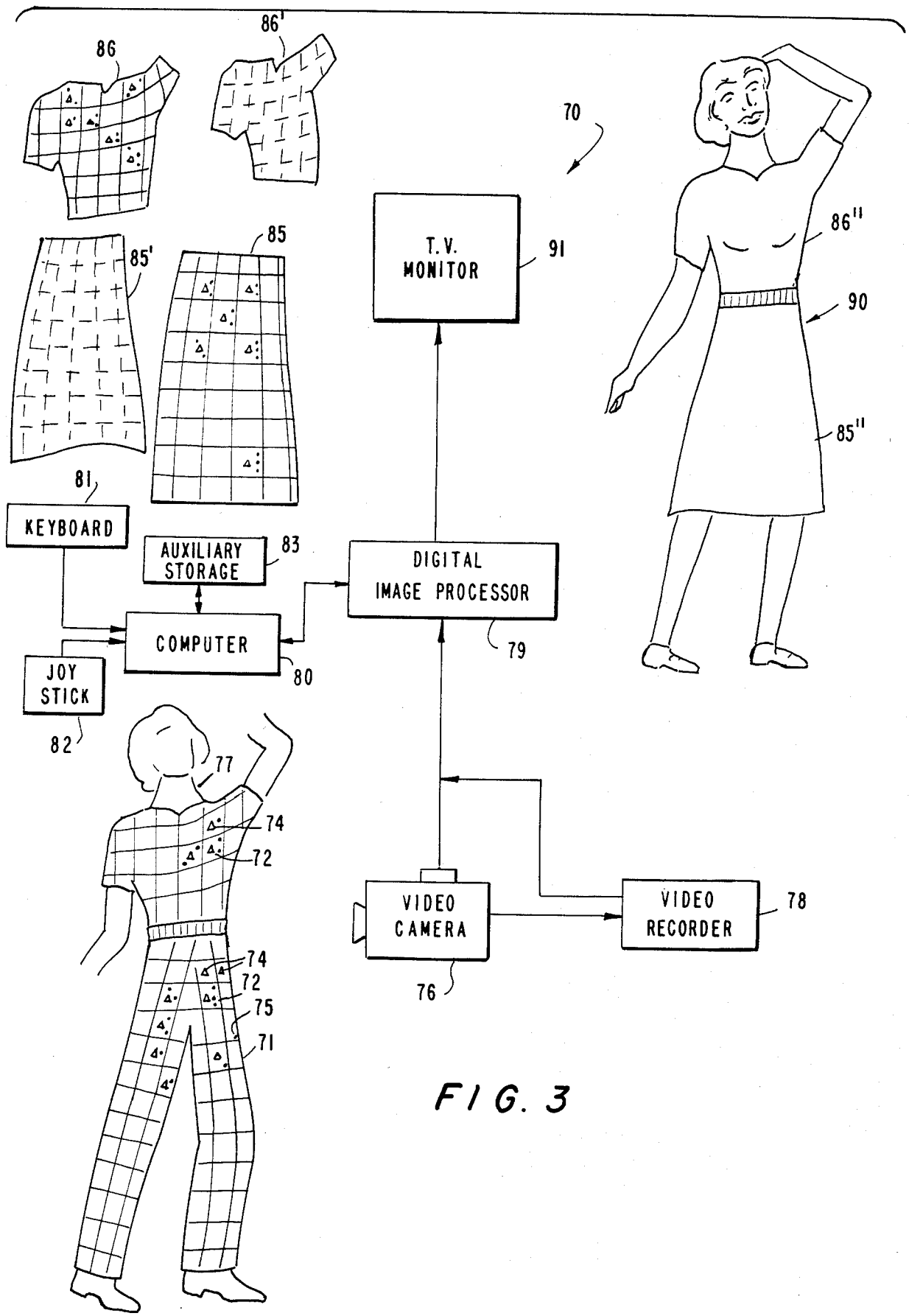
FIG. 3 is a schematic illustration of an alternate embodiment of the previewer of the present invention.

Referring now to FIG. 3, there is shown an alternate embodiment of the invention, namely, dynamic fashion previewer system 70. System 70 comprises a novel reference garment 71 which contains a plurality of coded indicia segments 72 which segments 72 *in toto* form a composite image of the garment. The segments each contain coded indicia, such as an equilateral triangle 74 orientation reference, and an imprinted binary reference number 75, so that the identification and orientation of each segment can be computer identified for reasons hereinafter appearing.

A video camera 76 images the subject 77 wearing form fitting garment 71, and these images in continuous motion are recorded on video recorder 78 for later transmission to the digital image processor 79, or these images are transmitted directly into the digital image processor 79 in realtime. A computer 80 retrieves graphic specifications 85 and 86 of a high plurality of apparel with coded indicia segments with binary digit reference information corresponding to the body location on which that item of apparel should appear in relation to the corresponding segment on garment 71 (i.e. in the position as it should be worn by the subject). The computer 80 additionally retrieves matching graphic descriptions 85' and 86' for a selected article design, corresponding to the specifications 85 and 86. A keyboard 81, joystick 82 and auxiliary storage 83, provide additional selected input to the computer to select and modify the particular article or combination of articles desired to be previewed by the subject user.

The computer 80 and digital image processor 79 modify or re-image the selected articles 85' and 86' in accordance with the information provided from the image of the segments of garment 71. The figure of the user is transmitted from video recorder 78 or from video camera 76 to digital image processor 79 whereat a composite image 90 is formed on video display monitor 91. Composite image 90 of course contains the subject human figure information as pre-recorded or recorded in real-time and the selected articles of apparel 85' and 86' as re-oriented or re-imaged 85" and 86" in accordance with the orientation of indicia segments 72 for each video frame. With each consecutive frame change or realtime change in subject position there is computer re-imaging of the article or combination of articles.

In this manner of construction the pre-recorded or recorded in realtime subject is shown with selected articles of clothing in a fashion preview undergoing the normal movement in previewing a fashion. That is as the image of the figure of the subject moves, the article is re-imaged accordingly in a fluid motion manner by the program altering memory of the digital image processor 79. The triangle orientation reference indicia 72 may be of color not found on the face or body of the subject, so that the computer and/or digital image processor, depending upon the function assignment of the units, can access that colored triangle as the orientation reference point. The computer and/or digital image processor may encode for about 5-6 bits which represent the triangle color, and about 6 bits for intensity of color in addressable memory, and then there is pattern recognition memory and instructions in finding the apeces of the triangle. Once the apeces are computer determined, the computer or digital image processor determines the difference between the viewed triangle and the base point equilateral triangle, and then provides a set of instructions based on this differential in triangle orientation, to the article (e.g. eyeglasses, clothes) image graphic generators. Other orientation indicia symbols and configurations, including naturally occuring orientation reference points which may be computer or human recognized are also within the contemplation of the invention.

While the aforesaid embodiments have been described with respect to articles of apparel and eyeglasses, other articles such as jewelry, hairstyles, false eyelashes, make-up, prosthetic and cosmetic surgical changes are within the broad contemplation of the invention. In addition, the subject need not be human but may be an inanimate setting, such as a room and the article be articles of furniture, so that a room may be redecorated in previewing.

From the foregoing it will be apparent that a new and improved previewing system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A previewer comprising:
   computer means to generate a graphic image of an article to be previewed;
   means to store a plurality of video images of a subject, and further comprising means to select a specific frame of said subject images, and subject orientation reference means for each frame; said computer means accessing said subject image storage means, and having means to re-image said article in accordance with said subject orientation reference means for the specific selected frame, and means to form a composite image of said re-imaged article and said subject image for said selected frame, and means to display said composite image, said orientation means comprising indicia providing x-y-z axes orientation and angular rotation orientation with respect to said axes.

2. The previewer of claim 1, further comprising subject frame identification means and said computer means further comprising means to read said frame identification means.

3. The previewer of claim 2, said frame identification comprising means to generate binary digital information, and means to read said binary digital information and access same to said computer means.

4. The previewer of claim 2, further comprising means to record said subject video images and to transmit said subject video images from said recorder to said storage means.

5. The previewer of claim 4, further comprising video display means to display said subject images, and wherein said frame identification means and orientation means is displayed on said video display means.

6. The previewer of claim 5, said means to form said composite comprising a video mixer.

7. The previewer of claim 1, further comprising means to select the article, and said article selection means being interconnected to said computer means.

8. The previewer of claim 1, further comprising joystick means interconnected to said computer means to re-orient said video subject image.

9. The previewer of claim 8, said joystick being formed in the configuration of said subject.

10. The previewer of claim 1, said article comprising a plurality of articles for use by a human and the subject being a human subject so as to provide a fashion previewer.

11. The previewer of claim 1, said indicia comprising a single geometric shape.

12. The previewer of claim 11, said geometric shape being provided on one part of the subject.

13. A fashion previewer comprising;
   a garment comprising a plurality of coded indicia thereon; video camera means to photograph said coded indicia on said garment when worn by the subject, digital image processor means to convert said plurality of coded indicia into digital information instructions, and computer means having access to said digital image processor means, said computer means having means to generate a plurality of wearing apparel image information in accordance with the digital information instructions, and means to display said re-imaged wearing apparel information as if worn by the subject, each said coded indicia comprising garment orientation reference means, each said orientation reference means comprising indicia providing x-y-z axes orientation and angular rotation orientation with respect to said axes.

14. The fashion previewer of claim 13, whereby the movement of the subject with said garment causes coded indicia information variations, said digital image processor comprising means to process said variations with the movement so that the re-imaged apparel is continuously displayed with subject movement.

15. The fashion previewer of claim 12, each said orientation referring means comprising indicia providing x-y-z axes orientation and angular rotation orientation with respect to said axes.

16. The fashion previewer of claim 13, further comprising means to select a wearing apparel image, and said wearing apparel selection means being interconnected to said computer means.

17. The fashion previewer of claim 13, each said coded indicia comprising indentification means.

18. The fashion previewer of claim 17, each said identification means comprising binary reference number.

19. The fashion previewer of claim 13, said garment being form fitting to the subject.

20. A previewer comprising;
   computer means to generate graphic image information of an article to be previewed;
   means to transmit a video image of a subject having subject orientation reference information, and means to process said subject video image; said computer means having means to input said subject orientation reference information and to re-image said article in accordance with the subject orientation reference information; and means to display said subject video image with said re-imaged article image as a composite image, said orientation reference information comprising indicia providing x-y-z axes orientation and angular rotation orientation with respect to said axes.

21. The previewer of claim 20, further comprising means to alter the image of said article in a manner not theretofore defined in said computer means to generate said graphic image of the article.

22. The previewer of claim 21, said means to input the subject orientation reference information comprising joysticks means.

23. The previewer of claim 21, said means to alter the image of said article comprising keyboard means.

* * * * *